(12) United States Patent
Koike

(10) Patent No.: US 9,027,149 B2
(45) Date of Patent: May 5, 2015

(54) SECRET SHARING SYSTEM, APPARATUS, AND STORAGE MEDIUM

(71) Applicants: Kabushiki Kaisha Toshiba, Minato-ku (JP); Toshiba Solutions Corporation, Minato-ku (JP)

(72) Inventor: Masanobu Koike, Tama (JP)

(73) Assignees: Kabushiki Kaisha Toshiba, Minato-ku (JP); Toshiba Solutions Corporation, Minato-ku (JP)

(*) Notice: Subject to any disclaimer, the term of this patent is extended or adjusted under 35 U.S.C. 154(b) by 0 days.

(21) Appl. No.: 14/022,950

(22) Filed: Sep. 10, 2013

(65) Prior Publication Data

US 2014/0013439 A1 Jan. 9, 2014

Related U.S. Application Data

(63) Continuation of application No. PCT/JP2012/056754, filed on Mar. 15, 2012.

(30) Foreign Application Priority Data

Mar. 29, 2011 (JP) .................................. 2011-073016

(51) Int. Cl.
*G06F 7/06* (2006.01)
*G06F 17/30* (2006.01)
(Continued)

(52) U.S. Cl.
CPC ........ *H04L 63/0407* (2013.01); *G06F 21/6218* (2013.01); *H04L 9/085* (2013.01)

(58) Field of Classification Search
CPC .... G06F 21/10; G11B 20/00086; H04L 29/06

USPC ............................................. 726/26; 709/201
See application file for complete search history.

(56) References Cited

U.S. PATENT DOCUMENTS 5,594,903 A * 1/1997 Bunnell et al. ................ 717/162
2003/0221131 A1 11/2003 Mori et al.
(Continued)

FOREIGN PATENT DOCUMENTS

| JP | 2008-97591 | 4/2008 |
| JP | 2008-198016 A | 8/2008 |

(Continued)

OTHER PUBLICATIONS

Search Report issued Apr. 9, 2014 in Singaporean Patent Application No. 201306949-7.
(Continued)

*Primary Examiner* — Saleh Najjar
*Assistant Examiner* — Shu Chun Gao
(74) *Attorney, Agent, or Firm* — Oblon, McClelland, Maier & Neustadt, L.L.P.

(57) ABSTRACT

According to one embodiment, a secret sharing system of an embodiment includes a secret sharing apparatus, a plurality of first storage server apparatuses, and at least one second storage server apparatus. Upon reception of a delete request transmitted from the secret sharing apparatus, each first storage server apparatus reads out, based on name information in the received delete request, storage position information associated with the name information from storage position information storing unit. Each first storage server apparatus deletes all of share information and copy information indicated by name information in the received delete request based on the readout storage position information.

8 Claims, 8 Drawing Sheets

(51) Int. Cl.
  H04L 29/06    (2006.01)
  G06F 21/62    (2013.01)
  H04L 9/08     (2006.01)

(56) References Cited

U.S. PATENT DOCUMENTS

2006/0277413 A1    12/2006   Drews
2008/0082817 A1*   4/2008    Takahashi et al. ............ 713/155
2010/0268877 A1*   10/2010   Resch et al. .................. 711/114

FOREIGN PATENT DOCUMENTS

JP    2008-199278 A    8/2008
JP    2009-103774 A    5/2009
JP    2008-225740 A    9/2009

OTHER PUBLICATIONS

International Search Report mailed Apr. 24, 2012 for PCT/JP2012/056754 filed on Mar. 15, 2012 with English Translation.

International Written Opinion mailed Apr. 24, 2012 for PCT/JP2012/056754 filed on Mar. 15, 2012.

Adi Shamir, How to Share a Secret, Communications of the ACM, vol. 22, No. 11, Nov. 1979.

Extended European Search Report issued Dec. 5, 2014 in European Patent Application No. 12763847.6 (in English).

Ronald Cramer, et al., "On the Complexity of Verifiable Secret Sharing and Multiparty Computation"; International Association for Cryptologic Research; Jul. 27, 2000; vol. 20000727:155815; pp. 1-14.

* cited by examiner

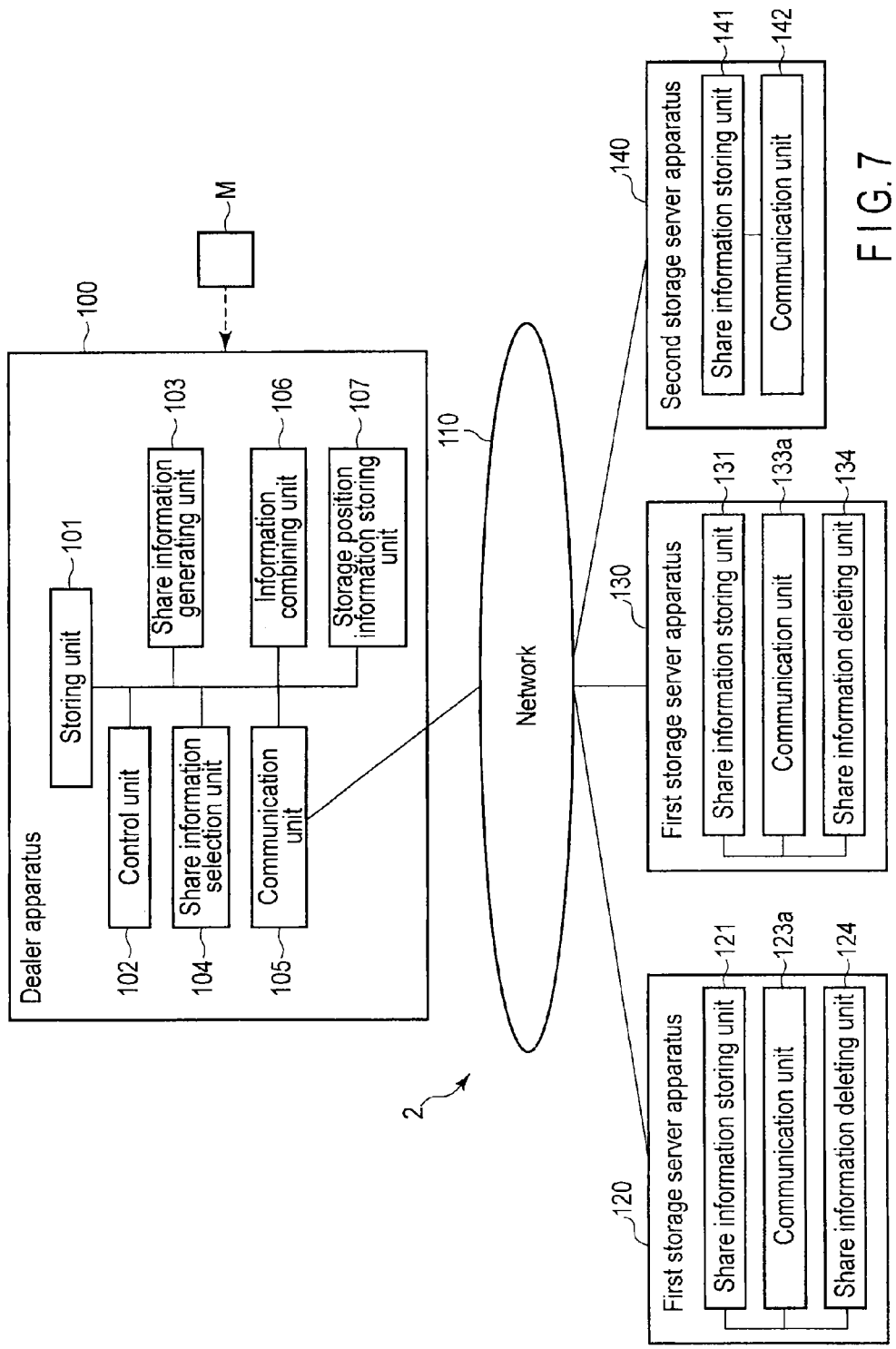
F I G. 7

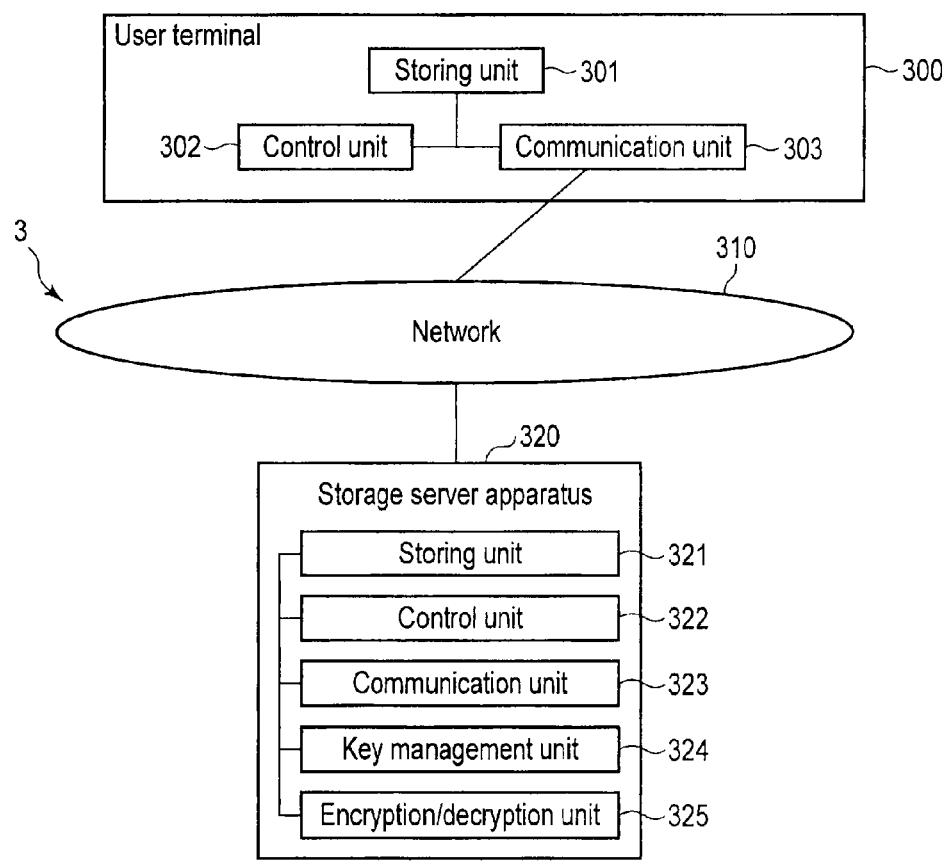
F I G. 10

SECRET SHARING SYSTEM, APPARATUS, AND STORAGE MEDIUM

CROSS REFERENCE TO RELATED APPLICATIONS

This application is a Continuation Application of PCT Application No. PCT/JP2012/056754, filed Mar. 15, 2012 and based upon and claiming the benefit of priority from Japanese Patent Application No. 2011-073016, filed Mar. 29, 2011, the entire contents of all of which are incorporated herein by reference.

FIELD

Embodiments described herein relate generally to a secret sharing system, apparatus, and storage medium.

BACKGROUND

In recent years, an information security technique for digital data has gained importance. The information security technique aims at assurance of confidentiality, integrity, and availability, and importance is given to confidentiality due to growing interest in information leakage recently.

In general, as a technique for assuring the confidentiality of digital data, an encryption technique is used. The encryption technique encrypts digital data to be secret (to be referred to as "secret information" hereinafter), and make it difficult to reconstruct secret information when a correction encryption key is not known.

FIG. 10 is a block diagram showing an example of an information security system 3 using the encryption technique.

Initially, at a user terminal 300, a control unit 302 transmits secret information in a storing unit 301 to a storage server apparatus 320 via a communication unit 303.

The storage server apparatus 320 executes an encryption operation for this secret information, and a decryption operation of the encrypted secret information.

In the encryption operation, when a communication unit 323 receives the secret information from the user terminal 300, a control unit 322 acquires an encryption key of the user who transmitted this secret information from a key management unit 324. An encryption/decryption unit 325 encrypts the secret information based on the acquired encryption key, and writes the encrypted secret information in a storing unit 321.

In the decryption operation, when the communication unit 323 receives a secret information read-out request from the user terminal 300, the control unit 322 acquires a decryption key in the storing unit 321 from the key management unit 324. This decryption key is that of the user who possesses the secret information. The encryption/decryption unit 325 decrypts the encrypted secret information based on the acquired decryption key, and returns the decrypted secret information to the user terminal 300 via the communication unit 323.

In such an information security system, a method of deleting a decryption key in the key management unit when original secret information is to be deleted is known. As a merit of this method, even when a copy of data is left in the storage server apparatus, since there is no decryption key, the secret information cannot be decrypted. However, since the security of the encryption technique is based on the computation cost of the current computer performance and deciphering technique, there is a fear that decryption of the secret information from data left in the storage server apparatus could be achieved, owing to progress in computer performance and deciphering techniques.

On the other hand, in addition to the encryption technique, a secret sharing technique as a technique for assuring confidentiality of digital data has received a lot of attention. The secret sharing technique has the following features. That is, secret information is divided to generate a plurality of pieces of share information. Of these pieces of share information, the original secret information can be reconstructed from a set of share information, which satisfies a predetermined set. However, the original secret information does not leak at all from a set of share information, which does not satisfy the predetermined set.

The encryption technique and secret sharing technique are largely different in that the security of the encryption technique is computational theoretic, but that of the secret sharing technique is information theoretic. For example, since the security of the encryption technique is based on a large computation cost required for deciphering, there is a fear of information leakage due to improvement in computer performance. By contrast, since the security of the secret sharing technique is based on the shortage of share information required for reconstruction, there is no fear of information leakage due to improvements in computer performance. In this manner, the security of the two techniques largely differs.

Furthermore, the secret sharing technique can assure availability in addition to confidentiality, and a (k, n) threshold secret sharing scheme proposed by Shamir is representative. The (k, n) threshold secret sharing scheme divides secret information into n pieces of share information, and allows arbitrary k pieces of share information to reconstruct the secret information, but does not allow arbitrary (k−1) pieces of share information to reconstruct the secret information. Note that k and n are respectively natural numbers which satisfy ($2 \leq k \leq n$).

Since such secret sharing technique assures information theoretic security, a data size of each share information cannot be smaller than that of the original secret information. For this reason, when secret information is divided into n pieces of share information, the total data size of the n pieces of share information becomes n times the original secret information, thus posing a problem.

On the other hand, in recent years, a resource providing service in which a resource provider of a third parity provides a huge resources to users using, for example, cloud computing or the like is growing. As resources, computer resources such as Central Processing Unit (CPU), memories and hard discs (HDD: Hard Disc Drive) are provided as needed. According to such resource providing service, since hard discs of large quantities are available, the aforementioned problem of the data size can be compensated for.

FIG. 11 is a block diagram showing an example of a secret sharing system 4 using a resource providing service. In the secret sharing system 4, a dealer apparatus 400 stores original secret information deposited from the user, and executes sharing processing, a distribution operation, and a reconstruction operation of this secret information. Storage server apparatuses 420, 430, and 440 are those possessed by a resource provider.

For example, in a case of the sharing processing and distribution operation, in the dealer apparatus 400, a share information generating unit 403 executes sharing processing to secret information in a storing unit 401 in accordance with an instruction of a control unit 402. Assume that this sharing processing is based on a (2, 3) threshold secret sharing scheme (k=2, n=3).

After the sharing processing, the dealer apparatus 400 respectively distributes three pieces of share information from a communication unit 404 to the storage server apparatuses 420, 430, and 440 via a network 410.

The storage server apparatuses 420, 430, and 440 respectively receive share information addressed to such apparatuses via communication units 422, 432, and 442, and store the information in storing units 421, 431, and 441.

Further, in a case of the reconstruction operation, the dealer apparatus 400 transmits a share information read-out request from the communication unit 404 to the storage server apparatuses 420, 430, and 440 via the network 410, and receives the returned pieces of share information. Note that the dealer apparatus 400 transmits the share information read-out request to k (k=2) or more storage server apparatuses. The storage server apparatuses as transmission targets of the share information read-out request are arbitrarily selected according to a user operation. Also, an information combining unit 405 combines the received pieces of share information according to an instruction of the control unit 402, thereby reconstructing the original secret information.

In such a secret sharing system, a method of deleting pieces of share information in the k or more storage server apparatuses when original secret information is to be deleted is known.

BRIEF DESCRIPTION OF THE DRAWINGS

FIG. 7 is a block diagram showing an example of the arrangement of a secret sharing system according to the second embodiment.

FIG. 10 is a block diagram showing an example of the arrangement of an information security system using a resource providing service which implements encryption/decryption of secret information.

DETAILED DESCRIPTION

Figure 1:
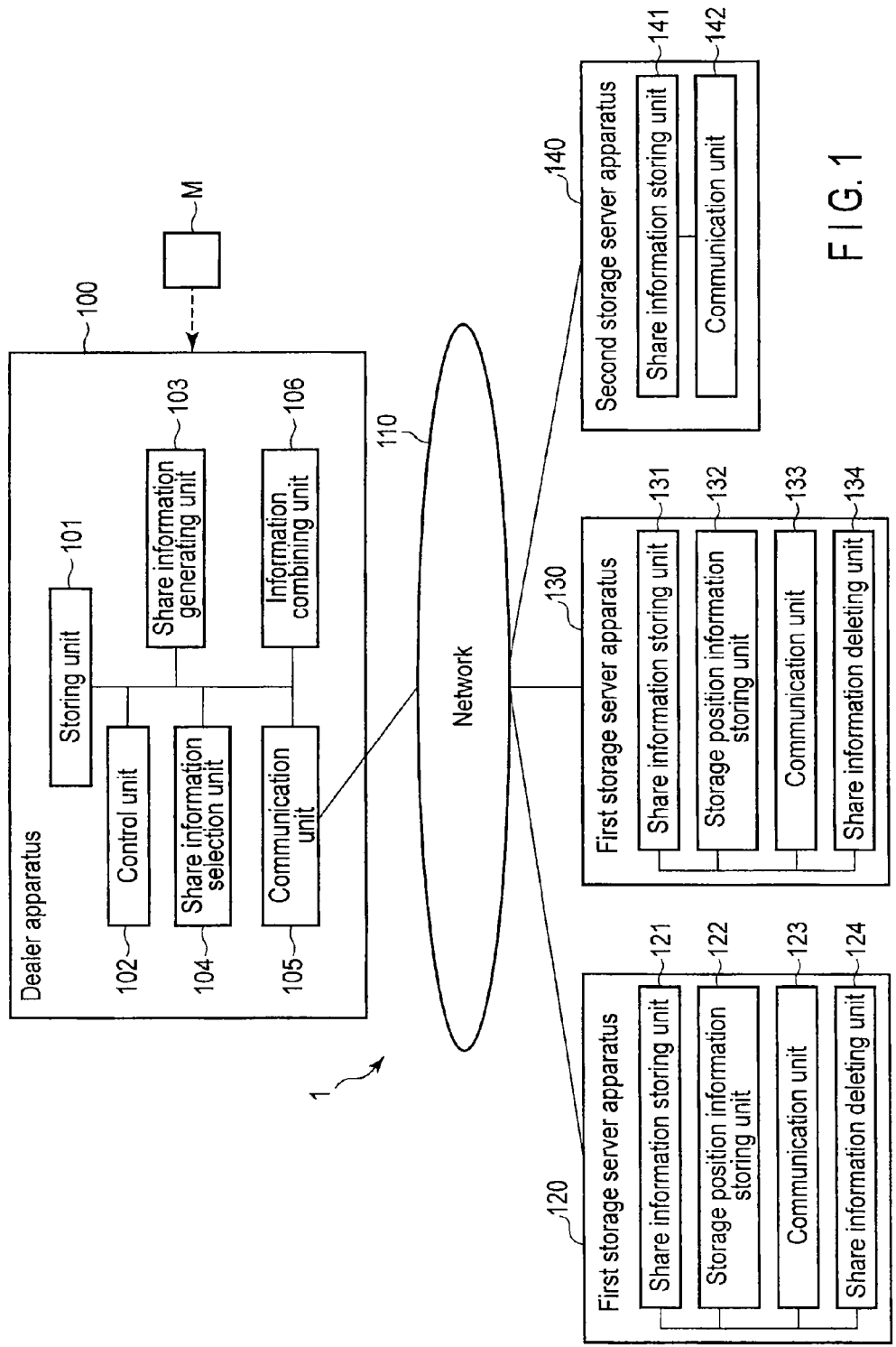
FIG. 1 is a block diagram showing an example of the arrangement of a secret sharing system according to the first embodiment.

Embodiments will be described hereinafter with reference to the drawings.

In general, according to one embodiment, a secret sharing system includes a secret sharing apparatus, a plurality of first storage server apparatus, at least one second storage server apparatus. The secret sharing apparatus is configured to execute a (k, n) threshold secret sharing scheme (for $2 \leq k \leq n$) which divides secret information into pieces of share information as many as the number n of shares, and is configured to reconstruct the secret information from not less than k pieces of share information (k is an arbitrary threshold) of the plurality of pieces of divided share information. The plurality of first storage server apparatuses, each of which includes share information storing unit configured to individually store share information distributed from the secret sharing apparatus, and is configured to control copy processing of the stored share information according to a user operation. The second storage server apparatus which includes share information storing unit configured to individually store share information distributed from the secret sharing apparatus, and is configured to execute copy processing of the stored share information at a predetermined timing. The secret sharing apparatus includes the various units. For example, a storing unit is configured to temporarily store the secret information. A unit is configured to accept inputs of the threshold k and the number n of shares according to a user operation. A unit is configured to divide the secret information in the storing unit into n pieces of share information based on the accepted threshold k and the accepted number n of shares, and the (k, n) threshold secret sharing scheme. A unit is configured to select not less than n−(k−1) pieces of share information of the n pieces of divided share information. A unit is configured to individually distribute the pieces of selected share information to the first storage server apparatuses. A unit is configured to individually distribute pieces of share information excluding not less than n−(k−1) pieces of selected share information of the n pieces of divided share information to the second storage server apparatus. A unit is configured to transmit a delete request, which includes name information indicating a name of share information distributed to each of the first storage server apparatuses and requests to delete that share information and copy information as a copy of the share information to the respective first storage server apparatuses according to a user operation. Each of the first storage server apparatuses includes the various units. For example, a storage position information storing unit is configured to store the name information and storage position information individually indicating storage locations of share information and copy information indicated by the name information in association with each other. A unit is configured to read out storage position information associated with the name information from the storage position information storing unit based on name information in the received delete request, when a delete request transmitted from the secret sharing apparatus is received. A unit is configured to delete all of share information and copy information indicated by the name information in the received delete request based on the readout storage position information.

Note that each of the following apparatuses can be implemented by either a hardware arrangement or a combined arrangement of hardware resources and software. As the software of the combined arrangement, programs, which are installed from a network or a non-transitory computer-readable storage medium M in computers in advance, and control the computers to implement functions of corresponding apparatuses, as shown in FIGS. 1 and 7, are used.

Also, the present embodiment has the following characteristic feature. That is, n−(k−1) pieces of share information are stored in first storage server apparatuses so as to surely delete share information in a (k, n) threshold secret sharing scheme (for 2≤k≤n). Thus, since only k−1 pieces of share information are stored in second storage servers, secret information cannot be reconstructed. Therefore, the number of second storage servers can be not more than "k−1", and the number of first storage servers can be not less than "n−(k−1)". Note that storage of many pieces of share information in the first storage servers is not preferable in terms of availability. For this reason, in the description of the following embodiments, "n−(k−1)" piece of share information, that is, "n−k+1" piece of share information as the minimum number of share information stored in the one of first storage server will be exemplified.

First Embodiment

FIG. 1 is a block diagram showing an example of the arrangement of a secret sharing system according to the first embodiment.

In a secret sharing system 1, a dealer apparatus 100 is connected to two first storage server apparatuses, 120 and 130, and one second storage server apparatus 140 via a network 110. Note that in the arrangement of this embodiment, the number of first storage server apparatuses is two, and the number of second storage server apparatuses is one. However, the present embodiment is not limited to such specific numbers of servers.

In this embodiment, the first storage server apparatuses 120 and 130 indicate storage server apparatuses, which can control copy processing of share information stored in these storage server apparatuses according to a user operation. The second storage server apparatus 140 indicates a storage server apparatus which executes copy processing of share information stored in this storage server apparatus at a predetermined timing. That is, upon reception of a copy request, which is transmitted from the dealer apparatus 100, includes name information indicating names of pieces of share information in the storage server apparatuses 120 and 130, and requests to copy these pieces of share information, the first storage server apparatuses 120 and 130 execute copy processing of these pieces of share information based on the received copy request. Further, the first storage server apparatuses 120 and 130 do not execute copy processing of share information when they do not receive any copy request from the dealer apparatus 100. Such dealer apparatus 100 and first storage server apparatuses 120 and 130 are preferably implemented by a private cloud of a resource provider in terms of easy management of the copy processing. Note that "name information indicating a name of share information" may be name information s11, name information s12, and name information s13, which include a name of secret information s1 and identification numbers 1, 2, and 3 of pieces of share information, and indicate names of the corresponding pieces of share information. Also, the second storage server apparatus 140 does not execute copy processing based on a copy request from the dealer apparatus 100 but automatically executes the copy processing at a predetermined timing. Such second storage server apparatus 140 can be implemented by a public cloud which cannot easily manage the copy processing.

The dealer apparatus 100 implements a secret sharing apparatus of the (k, n) threshold secret sharing scheme (for 2≤k≤n), which divides secret information into pieces of share information as many as the number n of shares, and can reconstruct the secret information from k or more pieces of share information (k is an arbitrary threshold).

Note that the dealer apparatus 100 can be implemented as a secret sharing apparatus of, for example, an (n, n) secret sharing scheme in place of the (k, n) threshold secret sharing scheme. In this case, the dealer apparatus which implements the secret sharing apparatus of the (n, n) secret sharing scheme is used while being connected to one first storage server apparatus and n−1 second storage server apparatuses via a network. Details of this dealer apparatus will be described later.

The dealer apparatus 100 includes a storing unit 101, control unit 102, share information generating unit 103, share information selection unit 104, communication unit 105, and information combining unit 106.

Note that the storing unit 101 is a storing device which is read/write accessible from the units 102 to 106, and temporarily stores secret information. The storing unit 101 may temporarily store data being processed by the units 102 to 106, and n pieces of share information divided by the share information generating unit 103.

The control unit 102 executes processing for accepting inputs of the aforementioned threshold k and the number n of shares according to a user operation. Also, the control unit 102 executes processing for controlling the operations of the units 103, 104, . . . , 106.

The share information generating unit 103 executes processing for dividing secret information into n pieces of share information based on the (k, n) threshold secret sharing scheme using the threshold k and the number n of shares accepted by the control unit 102.

The share information selection unit 104 executes processing for selecting n−k+1 pieces of share information of the n pieces of share information divided by the share information generating unit 103. Note that the n−k+1 pieces of share information mean n−(k−1) pieces of information, that is, k−1 pieces of share information as the remaining number of pieces of share information after deletion.

The communication unit 105 executes processing for distributing the n pieces of share information divided by the share information generating unit 103 to the n−k+1 first storage server apparatuses 120 and 130 and the k−1 second storage server apparatus 140 (for example, when k=2 and n=3), and reading out pieces of share information distributed to the storage server apparatuses 120, 130, and 140. Also, the communication unit 105 executes processing for individually transmitting various requests to the respective storage server apparatuses 120 to 140. More specifically, the communication unit 105 has the following functions (f105-1) to (f105-6).

(f105-1) A function of individually distributing n−k+1 pieces of share information selected by the share information selection unit 104 to the first storage server apparatuses 120 and 130.

(f105-2) A function of individually distributing pieces of share information except for the n−k+1 pieces of selected share information of the n pieces of share information divided by the share information generating unit 103 to the second storage server apparatus 140.

(f105-3) A function of transmitting a delete request, which includes name information indicating a name of each share information distributed to the first storage server apparatuses 120 and 130 and requests to delete that share information and copy information as a copy of the share information, to the first storage server apparatuses 120 and 130 according to a user operation.

(f105-4) A function of transmitting a copy request required to copy each piece of share information distributed to the first storage server apparatuses 120 and 130 to the first storage server apparatuses 120 and 130 according to a user operation.

(f105-5) A function of transmitting a read-out request required to read out each piece of distributed share information to the storage server apparatuses 120 to 140 according to a user operation.

(f105-6) A function of receiving each piece of share information returned from the storage server apparatuses 120 to 140 in response to the read-out request transmitted to the storage server apparatuses 120 to 140.

The information combining unit 106 executes processing for combining pieces of share information received by the communication unit 105 to reconstruct original information. In other words, the information combining unit 106 executes processing for reconstructing secret information from the k or more pieces of share information received by the communication unit 105 based on the (k, n) threshold secret sharing scheme.

The first storage server apparatuses 120 and 130 and the second storage server apparatus 140 will be described below. Note that since the first storage server apparatuses 120 and 130 have the same functional block arrangement, the following description will be given taking the first storage server apparatus 120 as a representative example.

The first storage server apparatus 120 includes a share information storing unit 121, storage position information storing unit 122, communication unit 123, and share information deleting unit 124.

Note that the share information storing unit 121 is a storage device or a storage area of the storage device, which is read/write accessible from the units 123 and 124, and stores share information distributed from the dealer apparatus 100.

Figure 2:
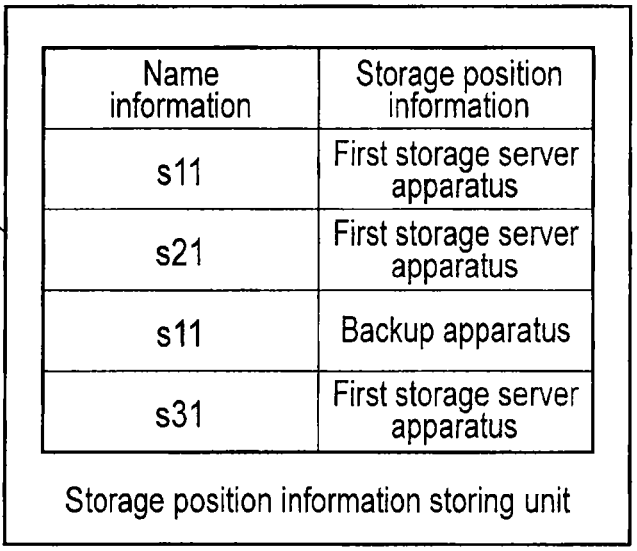
FIG. 2 is a table showing an example of information stored in a storage position information storing unit according to the first embodiment.

The storage position information storing unit 122 is a storage device or a storage area of the storage device, which is read/write accessible from the units 123 and 124, and stores name information s11, name information s21, and name information s31 indicating names of respective pieces of share information distributed from the dealer apparatus 100 to the first storage server apparatus 120, and storage position information individually indicating storage locations of share information and copy information indicated by each name information in association with each other, as shown in FIG. 2.

Figure 3:
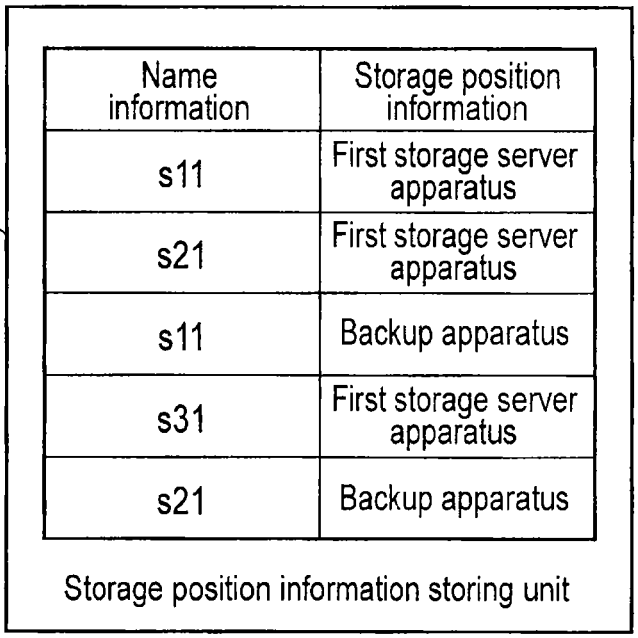
FIG. 3 is a table showing an example of information stored in the storage position information storing unit according to the first embodiment.

Note that pieces of share information corresponding to the name information s11, name information s21, and name information s31 are stored in the first storage server apparatus 120, as shown in FIG. 2. Copy information of the share information of the name information s11 is stored in a backup apparatus (not shown). Also, when share information is stored in the first storage server apparatus 120, new row information which associates name information and storage position information "first storage server apparatus" is added in the storage position information storing unit 122, as shown in FIG. 3. Likewise, when share information stored in the first storage server apparatus 120 is copied, new row information which associates name information and storage position information "backup apparatus" is added in the storage position information storing unit 122.

Upon reception of share information distributed from the dealer apparatus 100, the communication unit 123 executes processing for writing the received share information in the share information storing unit 121 and processing for writing storage position information of that share information in the storage position information storing unit 122. Also, the communication unit 123 executes processing for receiving various requests transmitted from the dealer apparatus 100. More specifically, the communication unit 123 has the following functions (f123-1) to (f123-4).

(f123-1) A function of writing, when share information distributed from the dealer apparatus 100 is received, the received share information in the share information storing unit 121.

(f123-2) A function of reading out, when a delete request transmitted from the dealer apparatus 100 is received, storage position information associated with name information in the received delete request from the storage position information storing unit 122 based on that name information.

(f123-3) A function of copying, when a copy request transmitted from the dealer apparatus 100 is received, share information in the share information storing unit 121 based on the received copy request. A function of writing copy information obtained by the copying in a backup apparatus (not shown), and a function of writing storage position information of that copy information in the storage position information storing unit 122.

(f123-4) A function of reading out, when a read-out request transmitted from the dealer apparatus 100 is received, share information from the share information storing unit 121 based on the received read-out request, and returning the readout share information to the dealer apparatus 100.

The share information deleting unit 124 has a function of deleting all of share information indicated by name information in the received delete request and copy information of that share information based on storage position information read out by the communication unit 123. Also, the share information deleting unit 124 has a function of deleting, after all of share information and copy information of that share information are deleted, all pieces of row information each indicating name information of the share information and storage position information associated with the name information based on the name information from the storage position information storing unit 122.

The second storage server apparatus 140 includes a share information storing unit 141 and communication unit 142.

The share information storing unit 141 stores share information distributed from the dealer apparatus 100 in the same manner as the share information storing unit 121 in the first storage server apparatus 120.

Upon reception of share information individually distributed from the dealer apparatus 100, the communication unit 142 executes processing for writing this share information in the share information storing unit 141. Also, upon reception of a read-out request from the dealer apparatus 100, the communication unit 142 executes processing for reading out share information from the share information storing unit 141, and returning that share information to the dealer apparatus 100.

The operation of the secret sharing system with the aforementioned arrangement will be described below with reference to FIGS. 4, 5, and 6. The operation of sharing processing of secret information will be described first taking a case of k=2 and n=3 as an example.

Figure 4:
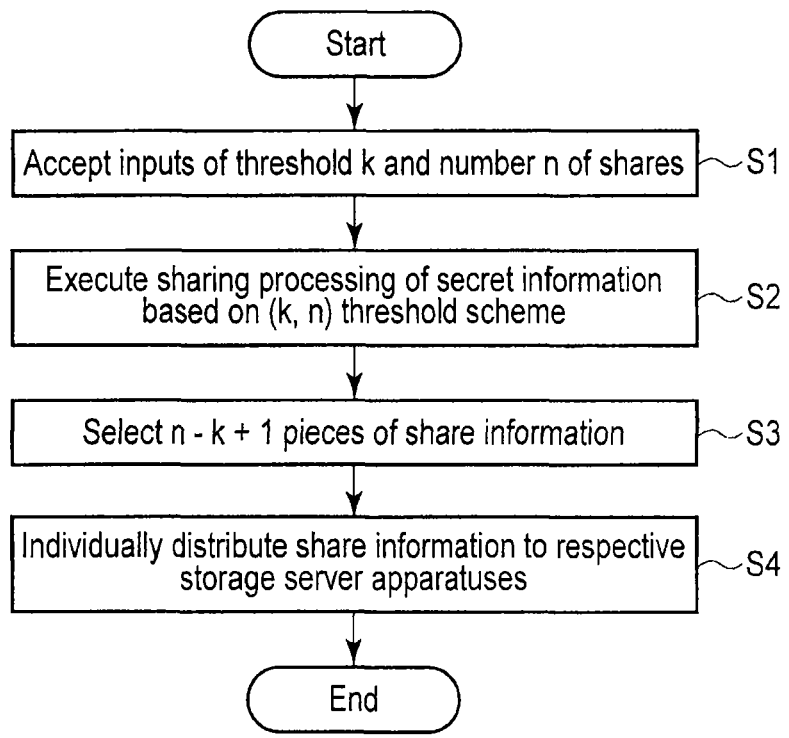
FIG. 4 is a flowchart showing an example of secret sharing processing of the secret sharing system according to the first embodiment.

As shown in FIG. 4, the control unit 102 accepts inputs of a value "2" of the threshold k and a value "3" of the number n of shares of the (k, n) threshold secret sharing scheme according to a user operation (step S1).

Figure 5:
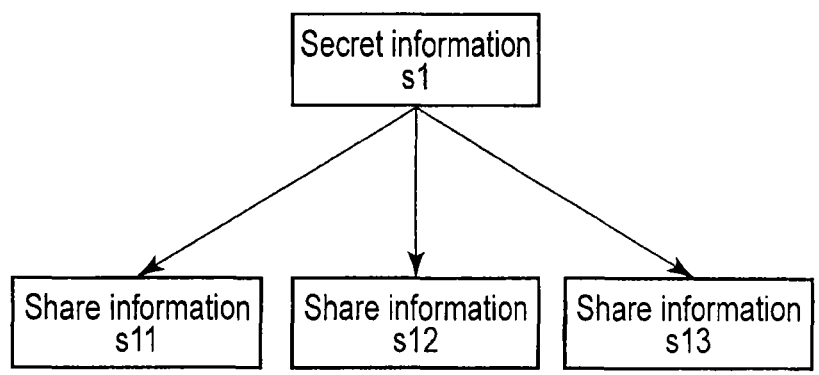
FIG. 5 is a view showing an example of the secret sharing processing of the secret sharing system according to the first embodiment.
Figure 6:
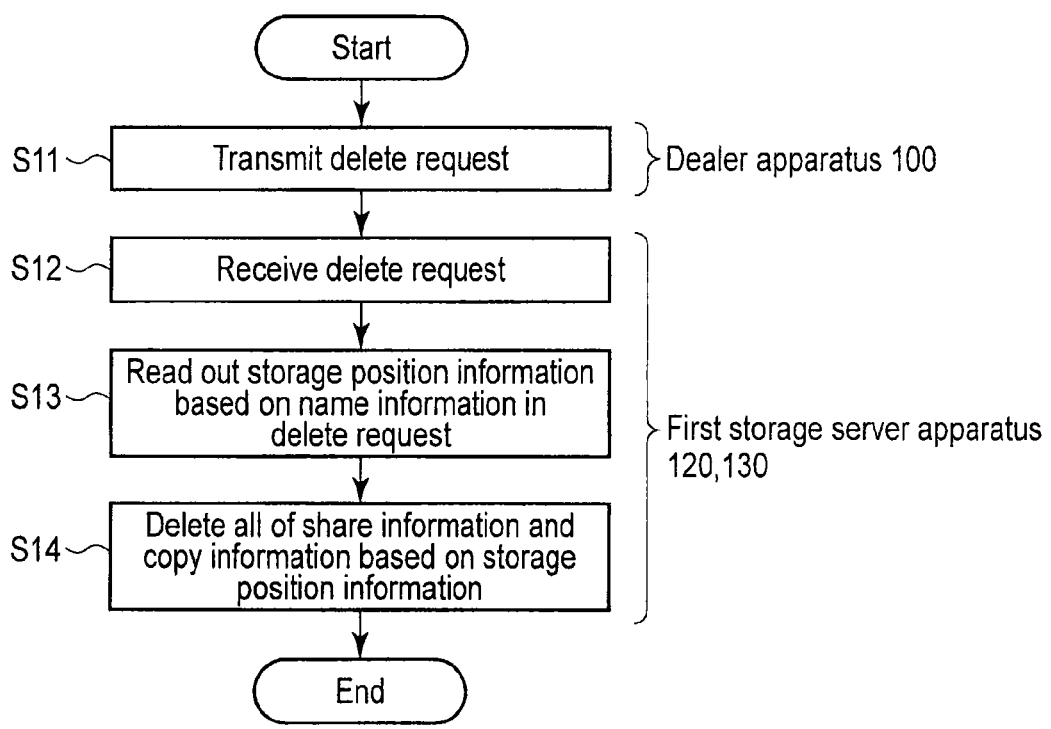
FIG. 6 is a flowchart showing an example of secret information invalidation processing of the secret sharing system according to the first embodiment.

Subsequently, the share information generating unit 103 divides secret information s1 in the storing unit 101 into three pieces of share information based on the threshold "2", the number of shares "3", and the (2, 3) threshold secret sharing scheme, as shown in FIG. 5, thereby generating share information s11, share information s12, and share information s13 (step S2). Note that the share information s11, share information s12, and share information s13 generated in step S2 are stored in the storing unit 101.

Next, the share information selection unit 104 selects two pieces of share information corresponding to n−k+1 pieces of information of the three pieces of generated share information (step S3). Assume that the share information selection unit 104 selects the share information s11 and share information s12.

After that, the communication unit 105 individually distributes the selected share information s11 and share information s12 to the first storage server apparatuses 120 and 130, and individually distributes the remaining share information s13 to the second storage server apparatus 140 (step S4).

Thus, the sharing processing of the secret information is completed. After that, the storage server apparatuses 120, 130, and 140 execute copy processing of the share information s11, share information s12, and share information s13 as needed.

Invalidation processing of secret information will be described below. Now assume that the processes of steps S1 to S4 have already been executed, the share information s11 and share information s12 are stored in the first storage server apparatuses 120 and 130, and the share information s13 is stored in the second storage server apparatus 140. Also, assume that backup apparatuses of the storage server apparatuses 120, 130, and 140 store corresponding pieces of copy information of the share information s11, share information s12, and share information s13.

Initially, the communication unit 105 transmits a delete request required to delete the share information s11 and share information s12 in the first storage server apparatuses 120 and 130 to the first storage server apparatuses 120 and 130 (step S11). In this case, the communication unit 105 transmits a delete request including name information "s11" of the share information s11 to the first storage server apparatus 120 so as to delete the share information s11 in the first storage server apparatus 120 and copy information of that share information. Likewise, the communication apparatus 105 transmits a delete request including name information "s12" to the first storage server apparatus 130.

The communication unit 123 in the first storage server apparatus 120 receives the delete request transmitted from the dealer apparatus 100 (step S12). Likewise, a communication unit 133 in the first storage server apparatus 130 receives the delete request transmitted from the dealer apparatus 100.

Next, the communication unit 123 reads out, based on the name information "s11" in the received delete request, storage position information "first storage server apparatus" and storage position information "backup apparatus" associated with this name information "s11" from the storage position information storing unit 122 (step S13). Likewise, the communication unit 133 reads out, based on the name information "s12" in the received delete request, storage position information associated with this name information "s12" from a storage position information storing unit 132.

After that, the share information deleting unit 124 deletes all of the share information s11 and the copy information of the share information s11 based on the readout storage position information "first storage server apparatus" and storage position information "backup apparatus" (step S14). Likewise, a share information deleting unit 134 deletes all of the share information s12 and the copy information of the share information s12 based on the readout storage position information.

Also, after all of the share information s11 and the copy information of the share information s11 are deleted, the share information deleting unit 124 deletes all of pieces of row information indicating the name information "s11" and pieces of storage position information associated with this name information "s11" in the storage position information storing unit 122.

According to the aforementioned first embodiment, with the arrangement in which the storage position information storing units 122 and 132 are arranged in the first storage server apparatuses 120 and 130 which can control copy processing, pieces of share information and copy information in the first storage server apparatuses 120 and 130 can be managed, and all pieces of share information and copy information in the first storage server apparatuses 120 and 130 can be deleted in response to the delete request.

Note that the first embodiment is not limited to the (k, n) threshold secret sharing scheme, but can be practiced even using the (n, n) secret sharing scheme using the threshold k which is equal to the number n of shares, as described above, since $2 \leq k \leq n$. In this case, one first storage server apparatus 120 need only be arranged, and remaining storage server apparatuses 130 and 140 can be second storage server apparatuses 130' and 140.

Also, in step S1, an input of the value "3" of the number n of shares is accepted (the threshold k is not input). In step S2, share information s11, share information s12, and share information s13 are generated based on the number of shares "3" and the (3, 3) secret sharing scheme as in the above description. In step S3, one piece (=n−n+1=n−(n−1)) of share information s11 is selected. In step S4, the communication unit 105 individually distributes the selected piece of share information s11 to the first storage server apparatus 120, and individually distributes the remaining share information s12 and share information s13 to the second storage server apparatuses 130' and 140. In the invalidation processing, assume that the first storage server apparatus 120 stores the share information s11, and the second storage server apparatuses 130' and 140 respectively store the share information s12 and share information s13.

Then, assume that backup apparatuses of the storage server apparatuses 120, 130', and 140 store corresponding pieces of copy information of the share information s11, share information s12, and share information s13. In steps S11 to S14, the operation of the first storage server apparatus 120 is as described above. However, since the (n, n) secret sharing scheme does not use any second storage server apparatus 130, the aforementioned operation of the first storage server apparatus 130 is skipped.

Note that as for implementation using the (n, n) secret sharing scheme in place of the (k, n) threshold secret sharing scheme, the same applies to the following embodiments.

Second Embodiment

FIG. 7 is a block diagram showing an example of the arrangement of a secret sharing system according to the second embodiment. The same reference numerals in FIG. 7 denote the same function units as those in FIG. 1, and a detailed description thereof will not be repeated. Different function units will be mainly described below. Note that in the following embodiments, a repetitive description will be avoided.

The second embodiment is a modification of the first embodiment. Unlike in the arrangement shown in FIG. 1, a storage position information storing unit 107 is arranged in a dealer apparatus 100 in place of storage position information storing units 122 and 132 in first storage server apparatuses 120 and 130.

That is, the dealer apparatus 100 includes a storing unit 101, control unit 102, share information generating unit 103, share information selection unit 104, communication unit 105a, information combining unit 106, and storage position information storing unit 107.

Note that information stored in the storing unit 101 and functions of the control unit 102, share information generating unit 103, share information selection unit 104, and information combining unit 106 are as described above.

Figure 8:
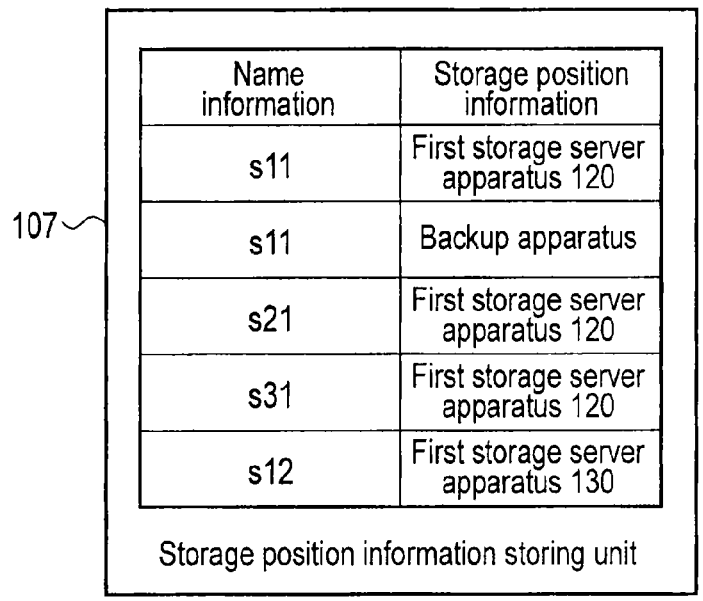
FIG. 8 is a table showing an example of information stored in a storage position information storing unit according to the second embodiment.

The storage position information storing unit 107 stores name information indicating a name of each share information distributed to the first storage server apparatuses 120 and 130, and storage position information individually indicating storage locations of share information indicated by the name information and copy information as a copy of that share information in association with each other, as shown in FIG. 8. That is, the storage position information storing unit 107 stores pieces of name information of share information and copy information stored in all the first storage server apparatuses 120 and 130 and corresponding pieces of storage position information in place of those for one first storage server apparatus 120 or 130, as shown in FIG. 8.

The communication unit 105a has, for example, the following function (f105a-1) in place of the function (f105-3) of the aforementioned communication unit 105. Note that the communication unit 105a has the same functions as the functions (f105-1), (f105-2), and (f105-4) to (f105-6) of the aforementioned communication unit 105.

Furthermore, the communication unit 105a executes processing for updating row information of name information and storage position information stored in the storage position information storing unit 107 when it transmits a delete request and copy request to the first storage server apparatuses 120 and 130. More specifically, the communication unit 105a has, for example, the following functions (f105a-2) and (f105a-3).

(f105a-1) A function of reading out name information stored in the storage position information storing unit 107 and storage position information associated with that name information according to a user operation, and transmitting a delete request which includes the readout name information and storage position information and requests to delete distributed share information and copy information of that share information to the first storage server apparatuses 120 and 130.

(f105a-2) A function of deleting, when a delete request, which includes name information and storage position information and requests to delete share information and copy information in the first storage server apparatuses 120 and 130, is transmitted according to a user operation, row information of the name information and storage position information in this delete request from the storage position information storing unit 107.

(f105a-3) A function of writing, when a copy request required to copy share information in the first storage server apparatuses 120 and 130 is transmitted according to a user request, row information of name information and storage position information in the storage position information storing unit 107 in association with each other based on the transmitted copy request.

The first storage server apparatuses 120 and 130 and a second storage server apparatus 140 will be described below. Note that since the first storage server apparatuses 120 and 130 have the same functional block arrangement, the following description will be given taking the first storage server apparatus 120 as a representative example. Also, the arrangement of the second storage server apparatus 140 is as described above.

The first storage server apparatus 120 includes a share information storing unit 121, communication unit 123a, and share information deleting unit 124.

Note that information stored in the share information storing unit 121 is as described above.

The communication unit 123a has a function of executing processing for receiving a delete request transmitted from the dealer apparatus 100 in place of the function (f123-2) of the aforementioned communication unit 123.

The share information deleting unit 123 has a function of deleting, based on storage position informant in a delete request received by the communication unit 123a, all of share information and copy information indicated by name information in the delete request.

The operation of the secret sharing system with the aforementioned arrangement will be described below with reference to the aforementioned flowchart of FIG. 4 and a new flowchart of FIG. 9.

Initially, as for the operation of sharing processing of secret information, the operations of steps S1 to S4 shown in FIG. 4 are executed as in the above description. However, immediately before or after step S4, the communication unit 105a writes name information indicating a name of each share information to be distributed to the first storage server apparatuses 120 and 130, and storage position information individually indicating a storage location of share information indicated by this name information in the storage position information storing unit 107 in association with each other.

Thus, the sharing processing of secret information is completed.

Invalidation processing of secret information will be described below. Now assume that the processes of steps S1 to S4 have already been executed, the share information s11 and share information s12 are stored in the first storage server apparatuses 120 and 130, and the share information s13 is stored in the second storage server apparatus 140. Also, assume that backup apparatuses of the storage server apparatuses 120, 130, and 140 store corresponding pieces of copy information of the share information s11, share information s12, and share information s13.

Figure 9:
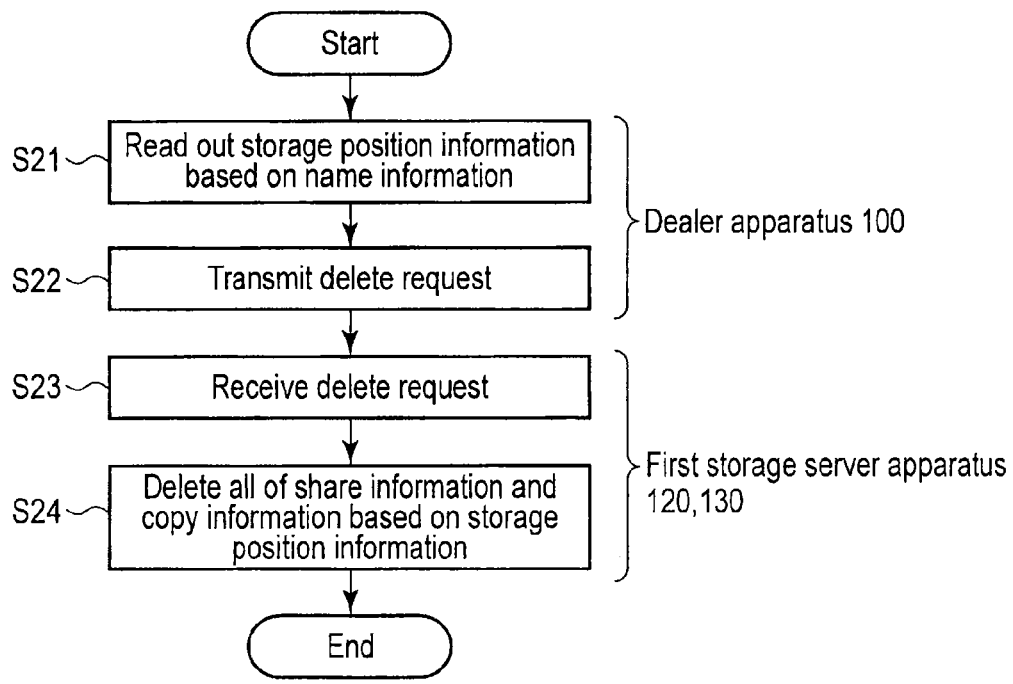
FIG. 9 is a flowchart showing an example of secret information invalidation processing of the secret sharing system according to the second embodiment.
Figure 11:
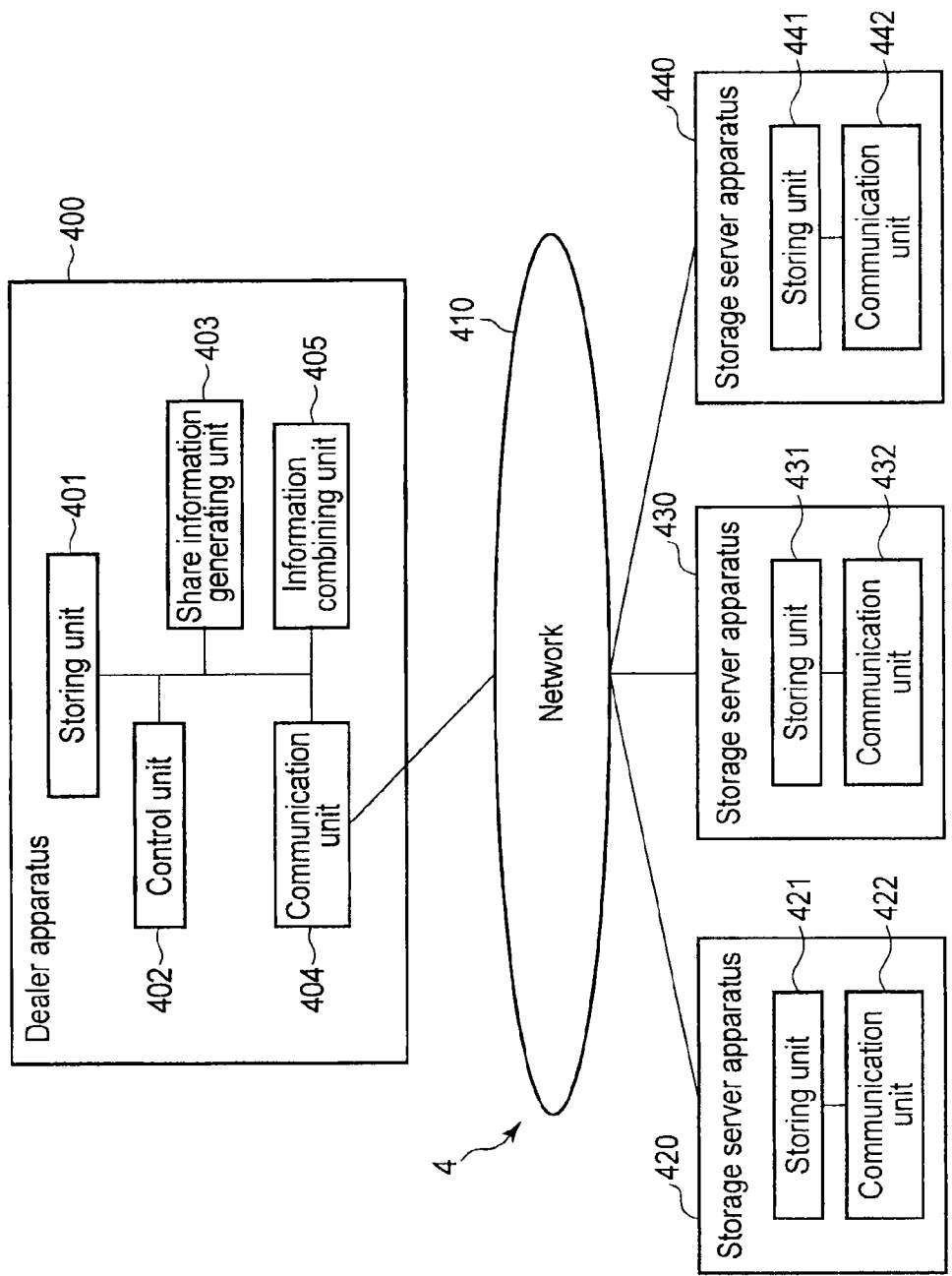
FIG. 11 is a block diagram showing an example of the arrangement of a secret sharing system using a resource providing service.

Initially, as shown in FIG. 9, the communication unit 105a reads out name information stored in the storage position information storing unit 107 and storage position information associated with that name information according to a user operation (step S21), and transmits a delete request, which includes the readout name information and storage position information and requests to delete the distributed share information and copy information of that share information to the first storage server apparatuses 120 and 130 (step S22). In this case, the communication unit 105a transmits a delete request including name information "s11" indicating a name of the share information s11 and storage position information to the first storage server apparatus 120 so as to delete the share information s11 in the first storage server apparatus 120 and copy information of the share information s11. Likewise, the communication unit 105a transmits a delete request including name information "s12" and storage position information to the first storage server apparatus 130. Also, the communication unit 105a deletes all pieces of row information each indicating the name information in the delete request and storage position information associated with that name information after transmission of the delete request.

On the other hand, the communication unit 123a in the first storage server apparatus 120 receives the delete request transmitted from the dealer apparatus 100 (step S23). Likewise, a communication unit 133a in the first storage server apparatus 130 receives the delete request transmitted from the dealer apparatus 100.

Next, the share information deleting unit 124 deletes all of the share information s11 and copy information of the share information s11 based on storage position information "first storage server apparatus" and storage position information "backup apparatus" in the delete request received by the communication unit 123a (step S24). Likewise, a share information deleting unit 134 deletes all of the share information s12 and copy information of the share information s12 based on storage position information in the delete request received by the communication unit 133a.

According to the aforementioned second embodiment, with the arrangement in which the storage position information storing unit 107 is arranged in the dealer apparatus 100, the number of pieces of share information and copy information stored in the first storage server apparatuses 120 and 130 and storage locations of these pieces of share information and copy information can be managed in the dealer apparatus 100.

Also, the second embodiment can be practiced using the (n, n) secret sharing scheme in place of the (k, n) threshold secret sharing scheme as in the above description. In this case, steps S1 to S4 can be practiced in the same manner as in the aforementioned example of the (n, n) secret sharing scheme. In the invalidation processing, assume that the first storage server apparatus 120 stores the share information s11 and the second storage server apparatuses 130' and 140 store the share information s12 and share information s13 as in the above description. Likewise, assume that backup apparatuses of the storage server apparatuses 120, 130', and 140 store corresponding pieces of copy information of the share information s11, share information s12, and share information s13. In steps S21 to S24, the operation of the first storage server apparatus 120 is as described in the second embodiment. However, since the (n, n) secret sharing scheme does not use any second storage server apparatus 130, the aforementioned operation of units 133a and 134 in the first storage server apparatus 130 is skipped. Note that this embodiment can be practiced using the (n, n) secret sharing scheme in place of the (k, n) threshold secret sharing scheme, as described above.

According to at least one of the aforementioned embodiments, with the system arrangement which uses the first storage server apparatus which can control copy processing and the second storage server apparatus which automatically executes copy processing together, even when copy information is left in the second storage server apparatus, original secret information can be invalidated.

The method described in the above embodiment may be stored and distributed in a storage medium such as a magnetic disk (such as a floppy [registered trademark] disk and a hard disk), an optical disk (such as a CD-ROM and a DVD), a magneto-optical (MO) disk, and a semiconductor memory, as a program which can be executed by a computer.

The storage medium may adopt any storage form, as long as it is a computer-readable storage medium which is capable of storing a program.

Part of the processing to carry out the above embodiment may be executed by an operating system (OS) which operates on the computer, or middleware (MW) such as database management software and network software, based on instructions of the program installed from the storage medium in the computer.

In addition, the storage medium in the embodiment is not limited to a medium independent of the computer, but also includes a storage medium which stores or temporarily stores a program downloaded over a LAN or the Internet.

The storage medium in the present invention is not limited to one. The present invention also includes the case where the processing in the embodiment is executed by using a plurality of storage media, and the storage medium may have either of the structures.

The computer in the embodiment executes the processing in the above embodiment, based on the program stored in a storage medium, and may be an apparatus such as a personal computer, or a system obtained by connecting a plurality of apparatuses through a network.

In addition, the computer in the embodiment is not limited to a personal computer, but also includes a processing unit or a microcomputer included in an information processing apparatus. The term "computer" in the embodiment is a general term for apparatuses and devices which are capable of achieving the function of the present invention by the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secret sharing system comprising:
a secret sharing apparatus configured to execute a (k, n) threshold secret sharing scheme (for 2≤k≤n) which divides secret information into pieces of share information as many as the number n of shares, and is configured to reconstruct the secret information from not less than k pieces of share information (k is an arbitrary threshold) of the plurality of pieces of divided share information;
a plurality of first storage server apparatuses, each of which comprises share information storing unit configured to individually store share information distributed from the secret sharing apparatus, and is configured to control copy processing of the stored share information according to a user operation; and
at least one second storage server apparatus which comprises share information storing unit configured to individually store share information distributed from the secret sharing apparatus, and is configured to execute copy processing of the stored share information at a predetermined timing,
the secret sharing apparatus comprising:
a storing unit configured to temporarily store the secret information;
a unit configured to accept inputs of the threshold k and the number n of shares according to a user operation;
a unit configured to divide the secret information in the storing unit into n pieces of share information based on the accepted threshold k and the accepted number n of shares, and the (k, n) threshold secret sharing scheme;
a unit configured to select not less than n−(k−1) pieces of share information of the n pieces of divided share information;
a unit configured to individually distribute the pieces of selected share information to the first storage server apparatuses;
a unit configured to individually distribute pieces of share information excluding not less than n−(k−1) pieces of selected share information of the n pieces of divided share information to the second storage server apparatus; and a unit configured to transmit a delete request, which includes name information indicating a name of share information distributed to each of the first storage server apparatuses and requests to delete that share information and copy information as a copy of the share information to the respective first storage server apparatuses according to a user operation, and each of the first storage server apparatuses comprising:

storage position information storing unit configured to store the name information and storage position information individually indicating storage locations of share information and copy information indicated by the name information in association with each other;

a unit configured to read out storage position information associated with the name information from the storage position information storing unit based on name information in the received delete request, when a delete request transmitted from the secret sharing apparatus is received; and a unit configured to delete all of share information and copy information indicated by the name information in the received delete request based on the readout storage position information.

2. A secret sharing system comprising:

a secret sharing apparatus configured to execute a (k, n) threshold secret sharing scheme (for 2≤k≤n) which divides secret information into pieces of share information as many as the number n of shares, and is configured to reconstruct the secret information from not less than k pieces of share information (k is an arbitrary threshold) of the plurality of pieces of divided share information;

a plurality of first storage server apparatuses, each of which comprises share information storing unit configured to individually store share information distributed from the secret sharing apparatus, and is configured to control copy processing of the stored share information according to a user operation; and at least one second storage server apparatus which comprises share information storing unit configured to individually store share information distributed from the secret sharing apparatus, and is configured to execute copy processing of the stored share information at a predetermined timing, the secret sharing apparatus comprising:

a storing unit configured to temporarily store the secret information;

a storage position information storing unit configured to store name information indicating a name of share information distributed to each of the first storage server apparatuses, and storage position information individually indicating storage locations, where share information indicated by the name information and copy information as a copy of the share information are stored, in association with each other;

a unit configured to accept inputs of the threshold k and the number n of shares according to a user operation;

a unit configured to divide the secret information in the storing unit into n pieces of share information based on the accepted threshold k and the accepted number n of shares, and the (k, n) threshold secret sharing scheme;

a unit configured to select not less than n−(k−1) pieces of share information of the n pieces of divided share information;

a unit configured to individually distribute the pieces of selected share information to the first storage server apparatuses;

a unit configured to individually distribute pieces of share information excluding not less than n−(k−1) pieces of selected share information of the n pieces of divided share information to the second storage server apparatus; and a unit configured to read out the stored name information and storage position information associated with the name information according to a user operation, and transmit a delete request, which includes the readout name information and storage position information and requests to delete the distributed share information and copy information of the share information to the respective first storage server apparatuses, and each of the first storage server apparatuses comprising:

a unit configured to delete all of share information and copy information indicated by the name information in the received delete request based on the storage position information in a received delete request, when a delete request transmitted from the secret sharing apparatus is received.

3. A secret sharing apparatus which is configured to communicate with a plurality of first storage server apparatuses, each of which comprises a share information storing unit configured to individually store share information distributed from the secret sharing apparatus, and is configured to control copy processing of the stored share information according to a user operation, and at least one second storage server apparatus which comprises a share information storing unit configured to individually store share information distributed from the secret sharing apparatus, and is configured to execute copy processing of the stored share information at a predetermined timing, and which apparatus is configured to execute a (k, n) threshold secret sharing scheme (for 2≤k≤n) which divides secret information into pieces of share information as many as the number n of shares, and is configured to reconstruct the secret information from not less than k pieces of share information (k is an arbitrary threshold) of the plurality of pieces of divided share information, the secret sharing apparatus comprising:

a storing unit configured to temporarily store the secret information;

a storage position information storing unit configured to store name information indicating a name of share information distributed to each of the first storage server apparatuses, and storage position information individually indicating storage locations, where share information indicated by the name information and copy information as a copy of the share information are stored, in association with each other;

a unit configured to accept inputs of the threshold k and the number n of shares according to a user operation;

a unit configured to divide the secret information in the storing unit into n pieces of share information based on the accepted threshold k and the accepted number n of shares, and the (k, n) threshold secret sharing scheme;

a unit configured to select not less than n−(k−1) pieces of share information of the n pieces of divided share information;

a unit configured to individually distribute the pieces of selected share information to the first storage server apparatuses;

a unit configured to individually distribute pieces of share information excluding not less than n−(k−1) pieces of selected share information of the n pieces of divided share information to the second storage server apparatus; and a unit configured to read out the stored name information and storage position information associated with the name information according to a user operation, and transmit a delete request, which includes the readout name information and storage position information and requests to delete the distributed share information and copy information of the share information to the respective first storage server apparatuses.

4. A non-transitory computer-readable storage medium storing a program executed by a processor of a secret sharing apparatus, the secret sharing apparatus which is configured to communicate with a plurality of first storage server apparatuses, each of which comprises a share information storing unit configured to individually store share information distributed from the secret sharing apparatus, and is configured to control copy processing of the stored share information according to a user operation, and at least one second storage server apparatus which comprises a share information storing unit configured to individually store share information distributed from the secret sharing apparatus, and is configured to execute copy processing of the stored share information at a predetermined timing, and which apparatus is configured to execute a (k, n) threshold secret sharing scheme (for 2≤k≤n) which divides secret information into pieces of share information as many as the number n of shares, and is configured to reconstruct the secret information from not less than k pieces of share information (k is an arbitrary threshold) of the plurality of pieces of divided share information, and comprises a storing unit and a storage position information storing unit, the program comprising:
- a first program code for controlling the processor to execute processing for temporarily writing the secret information in the storing unit;
- a second program code for controlling the processor to execute processing for writing, in the storage position information storing unit, name information indicating a name of share information distributed to each of the first storage server apparatuses, and storage position information individually indicating storage locations, where share information indicated by the name information and copy information as a copy of the share information are stored, in association with each other;
- a third program code for controlling the processor to execute processing for accepting inputs of the threshold k and the number n of shares according to a user operation;
- a fourth program code for controlling the processor to execute processing for dividing the secret information in the storing unit into n pieces of share information based on the accepted threshold k and the accepted number n of shares, and the (k, n) threshold secret sharing scheme;
- a fifth program code for controlling the processor to execute processing for selecting not less than n−(k−1) pieces of share information of the n pieces of divided share information;
- a sixth program code for controlling the processor to execute processing for individually distributing the pieces of selected share information to the first storage server apparatuses;
- a seventh program code for controlling the processor to execute processing for individually distributing pieces of share information excluding not less than n−(k−1) pieces of selected share information of the n pieces of divided share information to the second storage server apparatus; and
- an eighth program code for controlling the processor to execute processing for reading out the stored name information and storage position information associated with the name information according to a user operation, and transmitting a delete request, which includes the readout name information and storage position information and requests to delete the distributed share information and copy information of the share information to the respective first storage server apparatuses.

5. A secret sharing system comprising:

a secret sharing apparatus configured to execute an (n, n) secret sharing scheme (for 3≤n) which divides secret information into pieces of share information as many as the number n of shares, and is configured to reconstruct the secret information from all the pieces of divided share information;

a first storage server apparatus, which comprises a share information storing unit configured to individually store share information distributed from the secret sharing apparatus, and is configured to control copy processing of the stored share information according to a user operation; and a plurality of second storage server apparatuses, each of which comprises a share information storing unit configured to individually store share information distributed from the secret sharing apparatus, and is configured to execute copy processing of the stored share information at a predetermined timing, the secret sharing apparatus comprising:

a storing unit configured to temporarily store the secret information;

a unit configured to accept an input of the number n of shares according to a user operation;

a unit configured to divide the secret information in the storing unit into n pieces of share information based on the accepted number n of shares and the (n, n) secret sharing scheme;

a unit configured to select one piece of share information of the n pieces of divided share information;

a unit configured to distribute the selected share information to the first storage server apparatus;

a unit configured to individually distribute pieces of share information excluding not less than the selected share information of the n pieces of divided share information to the second storage server apparatuses; and a unit configured to transmit a delete request, which includes name information indicating a name of share information distributed to the first storage server apparatus and requests to delete that share information and copy information as a copy of the share information to the first storage server apparatus, and the first storage server apparatus comprising:

a storage position information storing unit configured to store the name information and storage position information individually indicating storage locations of share information and copy information indicated by the name information in association with each other;

a unit configured to read out storage position information associated with the name information from the storage position information storing unit based on name information in a received delete request, when a delete request transmitted from the secret sharing apparatus is received; and a unit configured to delete all of share information and copy information indicated by the name information in the received delete request based on the readout storage position information.

6. A secret sharing system comprising:
a secret sharing apparatus configured to execute an (n, n) secret sharing scheme (for 3≤n) which divides secret information into pieces of share information as many as the number n of shares, and is configured to reconstruct the secret information from all the pieces of divided share information;
a first storage server apparatus, which comprises a share information storing unit configured to individually store share information distributed from the secret sharing apparatus, and is configured to control copy processing of the stored share information according to a user operation; and
a plurality of second storage server apparatuses, each of which comprises a share information storing unit configured to individually store share information distributed from the secret sharing apparatus, and is configured to execute copy processing of the stored share information at a predetermined timing,
the secret sharing apparatus comprising:
a storing unit configured to temporarily store the secret information;
a storage position information storing unit configured to store name information indicating a name of share information distributed to the first storage server apparatus, and storage position information individually indicating storage locations, where share information indicated by the name information and copy information as a copy of the share information are stored, in association with each other;
a unit configured to accept an input of the number n of shares according to a user operation;
a unit configured to divide the secret information in the storing unit into n pieces of share information based on the accepted number n of shares and the (n, n) secret sharing scheme;
a unit which selects one piece of share information of the n pieces of divided share information;
a unit configured to distribute the selected share information to the first storage server apparatus;
a unit configured to individually distribute pieces of share information excluding the selected share information of the n pieces of divided share information to the second storage server apparatuses; and
a unit configured to read out the stored name information and storage position information associated with the name information according to a user operation, and transmit a delete request, which includes the readout name information and storage position information and requests to delete the distributed share information and copy information of the share information to the first storage server apparatus, and
the first storage server apparatus comprising:
a unit configured to delete all of share information and copy information indicated by the name information in a received delete request based on the storage position information in the received delete request, when a delete request transmitted from the secret sharing apparatus is received.

7. A secret sharing apparatus, which is configured to communicate with a first storage server apparatus, which comprises a share information storing unit configured to individually store share information distributed from the secret sharing apparatus, and is configured to control copy processing of the stored share information according to a user operation, and a plurality of second storage server apparatuses, each of which comprises a share information storing unit configured to individually store share information distributed from the secret sharing apparatus, and is configured to execute copy processing of the stored share information at a predetermined timing, and which apparatus is configured to execute an (n, n) secret sharing scheme (for 3≤n) which divides secret information into pieces of share information as many as the number n of shares, and is configured to reconstruct the secret information from all the pieces of divided share information,
the secret sharing apparatus comprising:
a storing unit configured to temporarily store the secret information;
a storage position information storing unit configured to store name information indicating a name of share information distributed to the first storage server apparatus, and storage position information individually indicating storage locations, where share information indicated by the name information and copy information as a copy of the share information are stored, in association with each other;
a unit configured to accept an input of the number n of shares according to a user operation;
a unit configured to divide the secret information in the storing unit into n pieces of share information based on the accepted number n of shares and the (n, n) secret sharing scheme;
a unit configured to select one piece of share information of the n pieces of divided share information;
a unit configured to distribute the selected share information to the first storage server apparatus;
a unit configured to individually distribute pieces of share information excluding the selected share information of the n pieces of divided share information to the second storage server apparatuses; and
a unit configured to read out the stored name information and storage position information associated with the name information according to a user operation, and transmit a delete request, which includes the readout name information and storage position information and requests to delete the distributed share information and copy information of the share information to the first storage server apparatus.

8. A non-transitory computer-readable storage medium storing a program executed by a processor of a secret sharing apparatus, which is configured to communicate with a first storage server apparatus, which comprises a share information storing unit configured to individually store share information distributed from the secret sharing apparatus, and is configured to control copy processing of the stored share information according to a user operation, and a plurality of second storage server apparatuses, each of which comprises a share information storing unit configured to individually store share information distributed from the secret sharing apparatus, and is configured to execute copy processing of the stored share information at a predetermined timing, and which apparatus is configured to execute an (n, n) secret sharing scheme (for 3≤n) which divides secret information into pieces of share information as many as the number n of shares, and is configured to reconstruct the secret information from all the pieces of divided share information, and comprises a storing unit and a position information storing unit,
the program comprising:
a ninth program code for controlling the processor to execute processing for temporarily writing the secret information in the storing unit;
a tenth program code for controlling the processor to execute processing for writing, in the storage position information storing unit, name information indicating a name of share information distributed to the first storage server apparatus, and storage position information individually indicating storage locations, where share information indicated by the name information and copy information as a copy of the share information are stored, in association with each other;

an eleventh program code for controlling the processor to execute processing for accepting an input of the number n of shares according to a user operation;

a twelfth program code for controlling the processor to execute processing for dividing the secret information in the storing unit into n pieces of share information based on the accepted number n of shares and the (n, n) secret sharing scheme;

a thirteenth program code for controlling the processor to execute processing for selecting one piece of share information of the n pieces of divided share information;

a fourteenth program code for controlling the processor to execute processing for distributing the selected share information to the first storage server apparatus;

a fifteenth program code for controlling the processor to execute processing for individually distributing pieces of share information excluding the selected share information of the n pieces of divided share information to the second storage server apparatuses; and a sixteenth program code for controlling the processor to execute processing for reading out the stored name information and storage position information associated with the name information according to a user operation, and transmitting a delete request, which includes the readout name information and storage position information and requests to delete the distributed share information and copy information of the share information to the first storage server apparatus.

* * * * *